United States Patent

Reininghaus

[11] Patent Number: 5,898,922
[45] Date of Patent: Apr. 27, 1999

[54] MOBILE RADIO SYSTEM

[75] Inventor: Georg Reininghaus, Wien, Germany

[73] Assignee: Siemens Aktiengesellschaft, Munich, Germany

[21] Appl. No.: 08/737,866

[22] PCT Filed: May 15, 1995

[86] PCT No.: PCT/DE95/00641

§ 371 Date: Nov. 19, 1996

§ 102(e) Date: Nov. 19, 1996

[87] PCT Pub. No.: WO95/32592

PCT Pub. Date: Nov. 30, 1995

[30] Foreign Application Priority Data

May 20, 1994 [DE] Germany ............................ 44 17 779

[51] Int. Cl.⁶ .................................................. H04Q 7/38
[52] U.S. Cl. ........................ 455/433; 455/435; 455/445
[58] Field of Search ................................... 455/432, 422, 455/433, 435, 466, 445, 560, 561

[56] References Cited

U.S. PATENT DOCUMENTS

| | | | |
|---|---|---|---|
| 4,775,999 | 10/1988 | Williams | 455/435 |
| 5,210,787 | 5/1993 | Hayes et al. | 455/436 |
| 5,577,264 | 11/1996 | Tuohino | 455/432 |
| 5,724,658 | 3/1998 | Hasan | 455/432 |

FOREIGN PATENT DOCUMENTS

| | | |
|---|---|---|
| 0 037 069 A3 | 7/1981 | European Pat. Off. . |
| 2280085 | 1/1995 | United Kingdom . |
| WO 94/08406 | 4/1994 | WIPO . |
| WO 95/01069 | 5/1995 | WIPO . |

OTHER PUBLICATIONS

Globecom, vol. 3, Nov. 29, 1993, Inter–Network Roaming Based on Personal Digital Cellular Standards, H. Sawada et al, pp. 1944–1949.

International Conference on Communications, vol. 2, May 23–26, 1993, Directory Services for Mobility Management in Private Telecommunication Networks, H. Maass et al, pp. 1252–1256.

Siemens —D900 —Mobile Communication System, System Description SYD, 1992, (Order No. A 30808–X3231–X–2–7618), pp. 1–76.

Primary Examiner—Willis R. Wolfe
Assistant Examiner—Hien T. Vo
Attorney, Agent, or Firm—Hill & Simpson

[57] ABSTRACT

In a mobile radio system which has at least two mobile radio regions (MFA, MFB), conversion of the different signaling protocols which exist in the mobile radio regions (MFA, MFB) can be obviated since, when the mobile station (MS) of the mobile subscriber is transferred from an originating mobile radio region (MFA) to a destination mobile radio region (MFB), the subscriber data which is stored in the old home register (HLRA) is transmitted to a new home register (HLRB) which is provided in the destination mobile radio region (MFB). The mobile subscriber who is transferred to the destination mobile radio region (MFB) is then served by the home register (HLRB) present there. A home register change between the mobile radio regions (MFA, MFB) consequently takes place in response to a request from the mobile subscriber, and, in combination with the retained method of visitor register interchange within the same mobile radio region (MFA or MFB), results in a highly flexible mobile radio system.

15 Claims, 3 Drawing Sheets

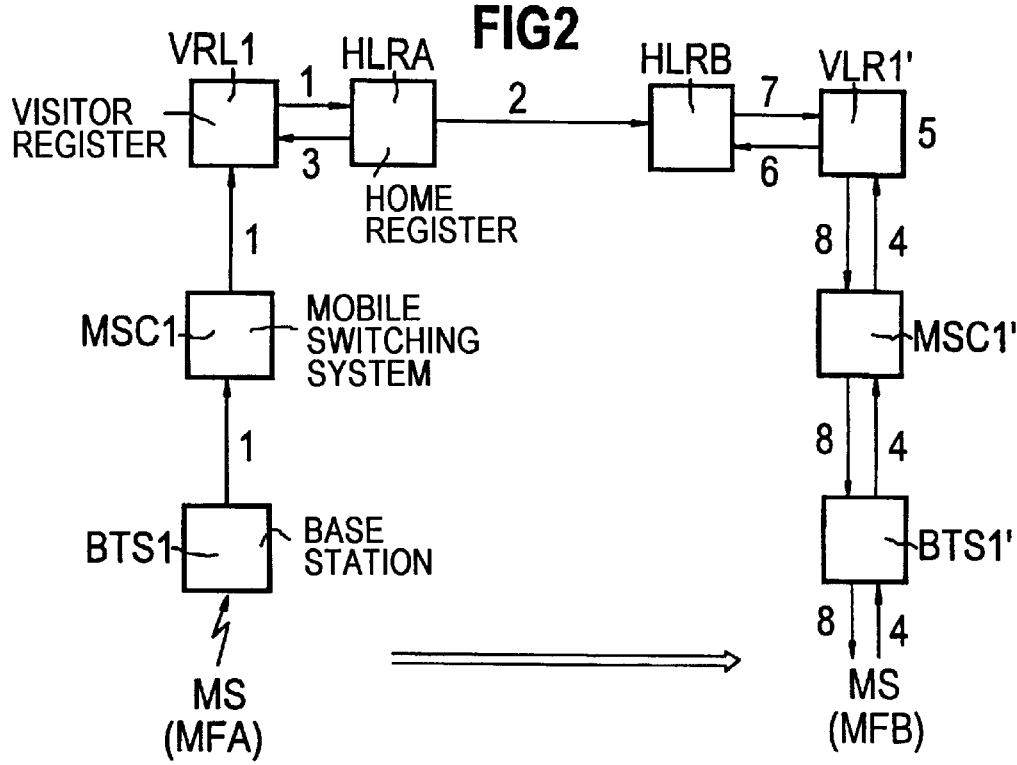
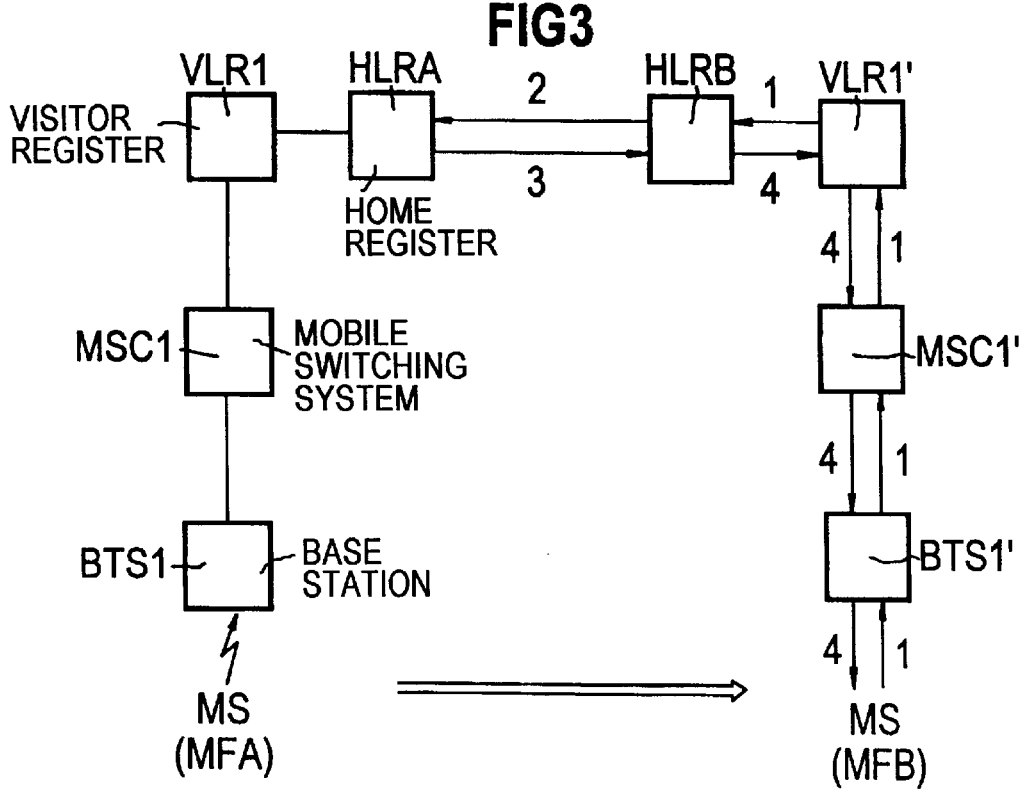

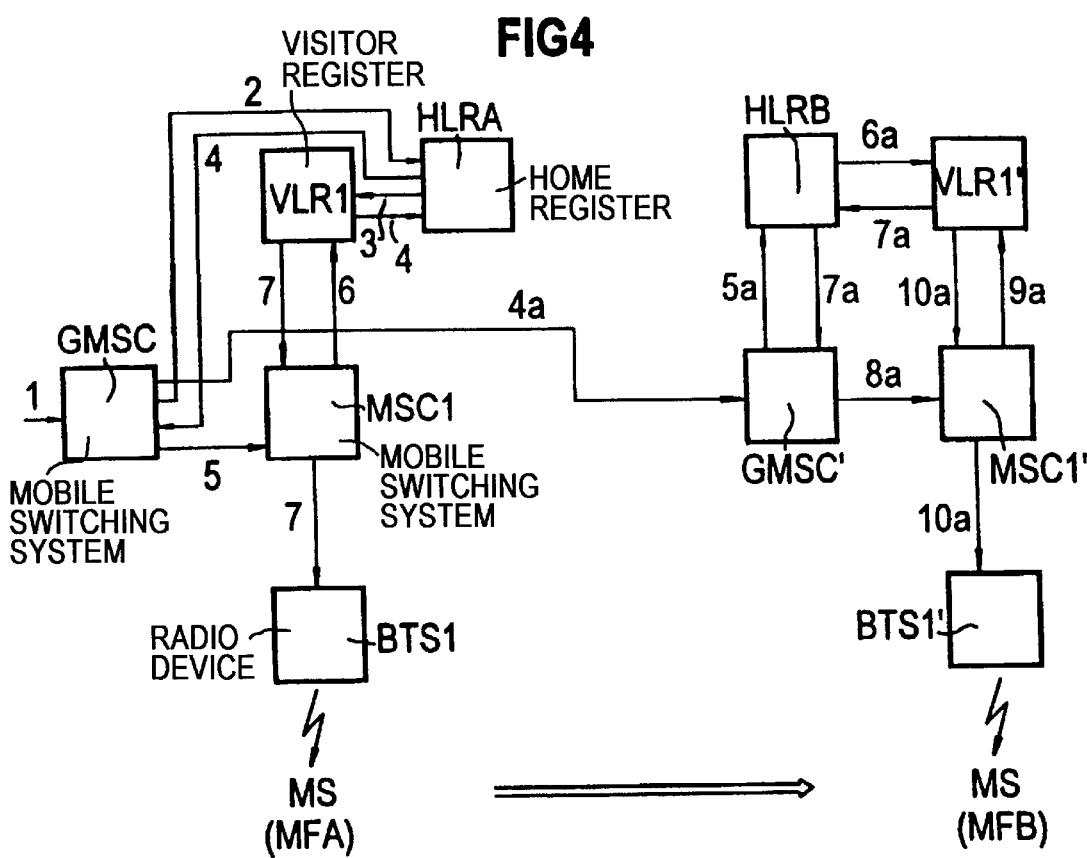

MOBILE RADIO SYSTEM

BACKGROUND OF THE INVENTION

The invention relates to a mobile radio system having at least two mobile radio regions.

In accordance with international standards, mobile radio systems are available having open interfaces which allow a combination of functional devices—exchanges, data banks, radio devices, etc—from different manufacturers. Outgoing and incoming telephone calls can be made everywhere in the mobile radio system, using one and the same mobile station, by means of a standard air interface for the wire-free link from the mobile stations of mobile subscribers to base station systems. A precondition for such a mobile radio system is a system of signaling links which is compatible throughout, in order to make it possible to transmit control information and data—as the generic term for all telecommunications signals which can be transmitted in the mobile radio system, such as voice signals, data signals etc—between the functional devices of the system.

As a result of the international standardization which is applicable to Europe, signaling protocols in accordance with the "Central Character System No. 7 (CCS7)" are used, for example, for these signaling links in a GSM mobile radio system (Global System for Mobile Communication). Corresponding standards are also available in the USA and other countries and continents. In consequence, it is possible for mutually incompatible signaling protocols to exist in a mobile radio system having at least two mobile radio regions—for example Europe and the USA. The mobile radio systems which exist in the various mobile radio regions are, in contrast, compatible with one another, that is to say similar subscriber data exist for designation of the mobile subscribers, and corresponding subscriber services. The problem of incompatible signaling protocols will be indicated using the example of the "roaming function" in the mobile radio system. Assuming that a mobile station which is served by a transmitting/receiving station of a base station system arranged in a first mobile radio region moves into the area of a transmitting/receiving station of a new base station system in a second mobile radio region ("roaming"), the subscriber data assigned to the mobile station by the home register of the first mobile radio region would have to be transmitted to the visitor register, which is linked to the new base system, of the second mobile radio region, and be stored there, when setting up a radio contact in the new region. The subscriber data which are stored in the last responsible visitor register of the first mobile radio region are deleted, and the address of the new visitor register is stored in the home register. It would be necessary to change from one signaling protocol to the other in order to carry out these data operations. The mobile subscriber, including his mobile station, is always entered with the associated subscriber data in only one home register and, at any time, in only a single visitor register which is currently responsible for the mobile subscriber.

Setting up and clearing connections between the home register and the respectively related visitor register, and the interchange of data and control information, are highly complex and require a powerful signaling protocol. If, as indicated above, the registers are located in at least two mobile radio regions having mutually incompatible signaling protocols, a translation function would be necessary for the transition between the mobile radio regions, or the functional devices of the mobile radio system would themselves have to cope with a plurality of such protocols. In any case, such an implementation of a mobile radio system having a plurality of mobile radio regions in which incompatible signaling protocols exist requires a high level of complexity when transferring the mobile station from a first mobile radio region to a second mobile radio region.

SUMMARY OF THE INVENTION

The object of the present invention is to implement a mobile radio system having at least two mobile radio regions in which mutually incompatible signaling protocols exist, in the case of which the disadvantages mentioned above can be avoided.

In general terms the present invention is a mobile radio system having at least two mobile radio regions in each of which mobile stations of mobile subscribers transmit and receive control information and data. During transmission or reception, the mobile stations are connected in a wireless manner via the air interface to radio devices of a base station system. At least one home register is provided in the respective mobile radio region for storage of the subscriber data which is characteristic for each mobile subscriber located therein. At least one visitor register is connected to the respective home register for storage of the subscriber data of the mobile subscribers who enter its responsibility area. Before transfer of the mobile station of the mobile subscriber from an originating mobile radio region to a destination mobile radio region, the subscriber data, which is stored in the home register of the originating mobile radio region, is transmitted to the home register of the destination mobile radio region and stored therein. As soon as a radio link is produced by the mobile station of the mobile subscriber to a radio device of the destination mobile radio region, the current visitor register receives from the home register of the destination mobile radio region the subscriber data of the mobile subscriber who is entering it responsibility area.

Advantageous developments of the present invention are as follows.

A line-switched or packet-switched link or a signaling link is in each case provided between the home register of the originating mobile radio region and the home register of the destination mobile radio region.

Before the transfer of the mobile station of the mobile subscriber from the originating mobile radio region to the destination mobile radio region, the change from the old home register to the new home register is requested by the mobile subscriber himself via a telephone link or a data link.

The change from the old home register to the new home register is requested by the mobile subscriber in the originating mobile radio region via his mobile station, the responsible visitor register and the old home register or, in the destination mobile radio region, via his mobile station, the responsible visitor register, the new home register, the link running between the two home registers and the old home register.

A subscriber number which is dialed to set up a call can in each case be activated and deactivated via the link running between the old home register and the new home register.

The address of the new home register in the destination mobile radio region is provided by it current visitor register by identification of the mobile station which is being transferred to the destination mobile radio region.

Changed subscriber data is first entered in the home register of the originating mobile radio region and is then transmitted tot he home register of the destination mobile radio region.

A request to change the subscriber data in the home register of the destination mobile radio region is passed on to the home register of the originating mobile radio region and the change is checked there. A control signal which characterizes the rejection or the acceptance of the request is transmitted back to the mobile station.

Subscriber numbers of the mobile subscriber for the originating mobile radio region and for the other mobile radio regions are stored in the home register of the originating mobile radio region. The subscriber number for the originating mobile radio region and the subscriber number for the home mobile radio region are in each case stored in the home registers of the other mobile radio regions as part of the subscriber data for setting up a call.

During the change from the originating mobile radio region to the destination mobile radio region, an original subscriber number, via which it was possible to access the mobile subscriber in the originating mobile radio region, is set to be inactive in the associated home register. A new subscriber number, via which it is currently possible to access the mobile subscriber in the destination mobile radio region, is set to be active in the associated home register.

A call using the subscriber number for the originating mobile radio region dialed by the calling subscriber is first set up to the originating mobile radio region and, after interrogation of the associated home register, is passed on directly to the called mobile subscriber in the originating mobile radio region or in the destination mobile radio region.

If the called subscriber is present in the originating mobile radio region, the address of the current visitor register is provided by his home register in the originating mobile radio region. If the called subscriber is present in the destination mobile radio region, the new subscriber number is provided by the home register of the originating mobile radio region and a link is produced to a separate mobile switching system of the destination mobile radio region, which system requests from the current home register the address of the current visitor register in the destination mobile radio region. The call to the current visitor register is set up using the address provided.

The subscriber number of the current mobile radio region is transmitted from the home register of the originating mobile radio region to the home registers of the other mobile radio regions and is stored therein. A call is set up directly to the called mobile subscriber in the current mobile radio region, using the subscriber number dialed by the calling subscriber for the closest mobile radio region, after interrogation of the associated home register.

If the calling mobile subscriber is present in the destination mobile radio region, the call is passed on directly in the destination mobile radio region to the called mobile subscriber, using the subscriber number of the destination mobile radio region dialed by the calling mobile subscriber.

Various mobile radio systems, which are compatible with one another in terms of the subscriber data and the subscriber services which are available to the mobile subscribers, are used with incompatible signaling protocols for the transmission of data and control information in the mobile radio regions.

A translation function between the signaling protocols which exist in the different mobile radio regions is obviated since, when the mobile station of the mobile subscriber is transferred from an originating mobile radio region to a destination mobile radio region, the subscriber data which are stored in the old home register are transmitted to a new home register which is provided in the destination mobile radio region. The mobile subscriber who has moved to the destination mobile radio region is then served by the home register present there. A home register change thus takes place when the mobile subscriber is "roaming" between the mobile radio regions and, in combination with the retained method of visitor register interchange within a mobile radio region, results in a highly flexible mobile radio system. Since mobile radio regions having associated signaling protocols as a rule relate to countries or even continents at great distances from one another—such as Europe and the USA for example—the time duration for the home register change is not critical. The visitor register change in real time is thus retained within a mobile radio region.

It is advantageous if the home registers which are arranged in the various mobile radio regions communicate with one another by means of a line-switched or a packet-switched link—for example an X.25 packet interlink—or by means of a signaling link. Real-time operation on the link between the home registers is not necessary. The control commands to carry out data operations, as are already used a conventional manner between the visitor register and the home register within one mobile radio region, can be transferred for communication between the home register of the originating mobile radio region and the home register of the destination mobile radio region. Examples of such commands are "enter data", "remove data", "delete the entire subscriber data set", etc.

According to a development of the invention, it is also advantageous, for setting up a call, to store subscriber numbers for the called mobile subscriber in the home register of the originating mobile radio region or in the home registers of the other mobile radio regions, via which subscriber numbers the subscriber in the destination mobile radio region can be accessed. Depending on the subscriber number dialed, the call can then be set up via the originating mobile radio region to the destination mobile radio region or can be passed on directly to the called mobile subscriber in the destination mobile radio region.

According to another development of the invention, the subscriber number of the current mobile radio region can be transferred from the home register of the originating mobile radio region to the home registers of the other mobile radio regions and can be stored therein so that a call is set up directly to the called mobile subscriber in the current mobile radio region using the subscriber number dialed by the calling subscriber for the closest mobile radio region, after interrogation of the associated home register.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which.

FIG. 2 shows an illustration of the principle of data operations between the functional devices of the mobile radio system when a mobile subscriber, including his mobile station, is being transferred from the originating mobile radio region to the destination mobile radio region, FIG. 3 shows an illustration of the principle of data operations during a change to the subscriber data of the mobile subscriber, and FIG. 4 shows an illustration of the principle of data operations for setting up a connection to the mobile subscriber on the basis of an incoming call.

DESCRIPTION OF THE PREFERRED EMBODIMENTS

Figure 1:
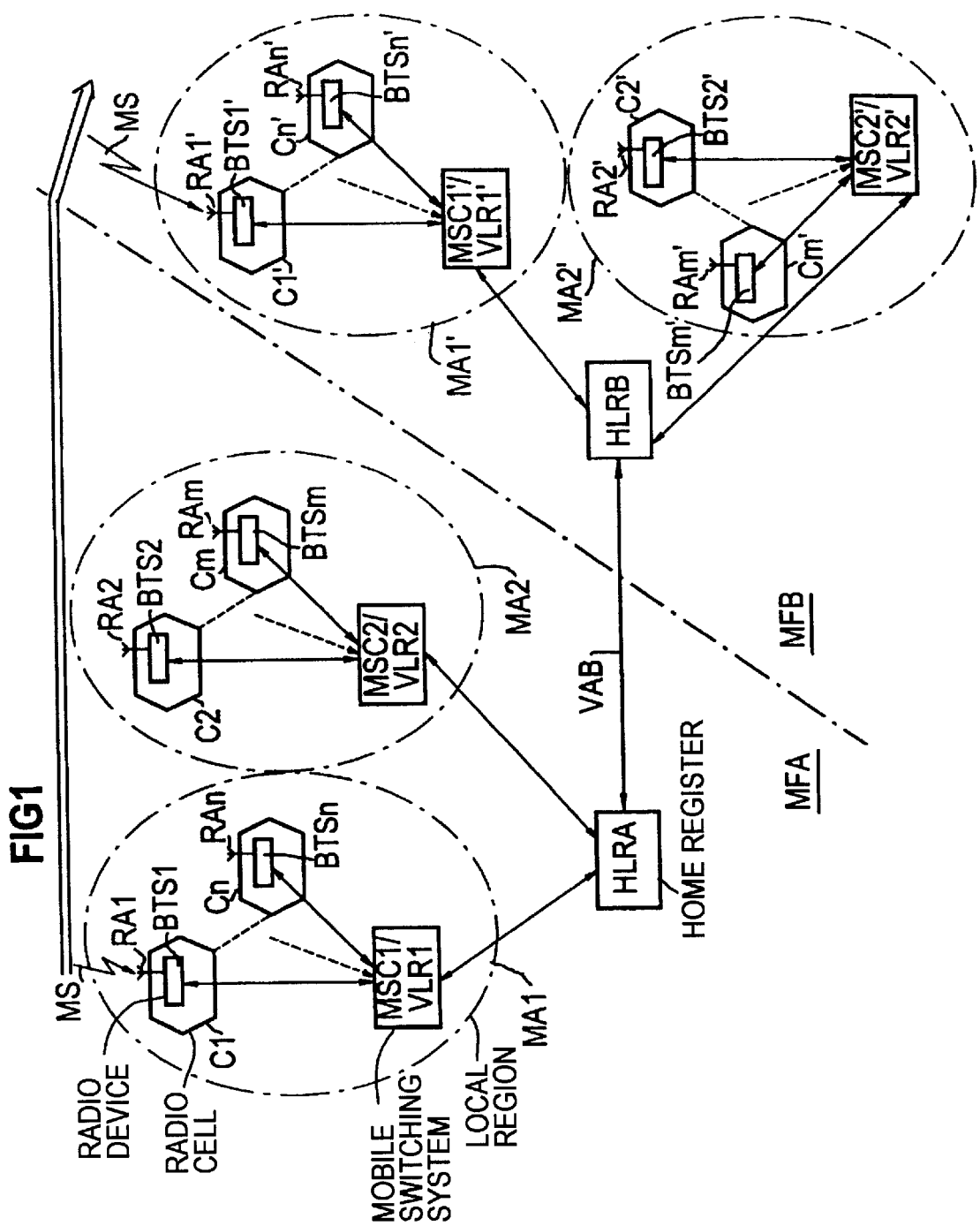
FIG. 1 shows the block diagram of a digital mobile radio system having two mobile radio regions.

FIG. 1 shows two mobile radio regions MFA and MFB in which, for example, mutually compatible digital mobile radio systems exist which use incompatible signaling protocols for the transmission of data and control information between the functional devices of the respective mobile radio system. For example, this may relate to the GSM mobile radio system (Global System for Mobile Communication), which is standardized for Europe, for the mobile radio system in the mobile radio region MFA, and to the mobile radio system, used in the USA, having a similar or identical structure in the mobile radio region MFB. It is also possible for the two mobile radio regions MFA and MFB to comprise parts of a single mobile radio system in which mutually incompatible signaling protocols exist. The combination of an analog mobile radio system in the mobile radio region MFA and a digital mobile radio system in the mobile radio region MFB can also be implemented.

The mobile radio system in the mobile radio region MFA is formed from a multiplicity of radio cells. Such a digital cellular mobile radio system in accordance with the GSM standard is known from the System Description "D900— Mobile Communication System" System Description SYD, 1992 (Order No. A 30808-X3231-X-2-7618) or from GSM Recommendation 09.02, Version 4.3.0 dated Apr. 2 1993. The mobile radio system extends over a plurality of local regions MA1, MA2 . . . , which have mutually corresponding devices.

The local region MA1 is covered by radio cells C1 . . . Cn in which radio contact with a mobile station MS of the mobile subscriber is possible by means of radio devices BTS1 . . . BTSn—so-called base transmitting/receiving stations. Assuming that the mobile subscriber is located in the radio cell C1, then radio contact can be produced from the mobile station MS, via the air interface, to the closest directional antenna RA1, which supplies him, of the radio device BTS1. The local region MA2 is covered by radio cells C2 . . . Cm in which radio devices BTS2 . . . BTSm—likewise base transmitting/receiving stations— produce contacts with the mobile stations via directional antennas RA2 . . . RAm. All the radio devices BTS1 . . . BTSn and BTS2 . . . BTSm are a component of a base station system which is provided for the mobile radio region MFA and is used as a connecting element between the radio part and the wired part of the mobile radio system. In this case, a plurality of radio devices in the respective local region MA1 or MA2 are in each case connected to one of a plurality of base station controllers (not illustrated) of the base station system.

Arranged in each local region MA1, MA2 is a mobile switching system MSC1, MSC2 which carries out the switching functions in it. In addition to carrying out the switching functions during telephone calls from the mobile subscriber to a second subscriber, the respective mobile switching system MSC1, MSC2 furthermore makes a range of services and additional services available to the mobile subscriber. The radio devices BTS1 . . . BTSn are connected to the mobile switching system MCS1, and the radio devices BTS2 . . . BTSm are connected to the mobile switching system MCS2. There is also a link from the respective mobile switching system MCS1, MCS2 to other networks, such as to the public telephone network or another mobile radio network, for example.

A visitor register VLR1, VLR2, for storing all the information, is connected to the respective mobile switching system MSC1, MSC2 via the mobile subscribers who are located in its responsibility area. The visitor register VLR1 or VLR2 can be considered as a dynamic subscriber data bank whose stored information is constantly updated as a result of the change of the mobile subscribers from or into the responsibility area of another visitor register. In addition to the local regions MA1, MA2 illustrated, there are also other local regions in the mobile radio region MFA, in which a dedicated mobile switching system and an associated visitor register are in each case likewise provided.

The information which is stored in the visitor register VLR1 . . . can be updated via at least one home register HLRA. The home register HLRA transmits to the respective visitor register VLR1, VLR2 all the data required to support the respective service. The characterizing information which is stored in the home register HLRA for each mobile subscriber contains, inter alia, his capability to access the mobile radio system and the services and additional services to which the subscriber subscribes. The mobile station MS and the data of its mobile subscriber are thus recorded in the home register HLRA and, at any time, in only a single one of the visitor registers VLR1 . . . All the visitor registers VLR1 . . . of the local regions MA1 . . . are linked to the home register HLRA in the mobile radio region MFA.

If, within the mobile radio region MFA, the mobile station MS and its mobile subscriber move from the area of the radio device BTS1 of the radio cell C1 of the local region MA1 into the area of a new radio device BTS2 of the radio cell C2 of the local region MA2, the subscriber data are transmitted from the home register HLRA to the currently responsible visitor register VLR2, and are stored in it. The subscriber data stored in the previously current visitor register VLR1 are deleted, and the address of the new visitor register VLR2 is entered in the home register HLRA. In this way, the mobile station MS is recorded in the responsible new visitor register VLR2 after moving from the radio cell C1 to the new radio cell C2 ("roaming"), so that outgoing calls from the mobile subscriber and incoming calls to the mobile subscriber are handled via the new visitor register VLR2 and the mobile switching system MSC2 which is responsible in the local region MA2. The "roaming" function indicated above is also available to the other mobile stations in the mobile radio region MFA. A standardized signaling protocol—for example that in accordance with the Central Character System No. 7 (CCS7)—is used for setting up and clearing connections between the home register HLRA and in each case one of the visitor registers VLR1 . . .

It is assumed that a digital mobile radio system of cellular design likewise exists in the mobile radio region MFB and is different in terms of the signaling protocol than the GSM mobile radio system, which is standardized for Europe, in the mobile radio region MFA. The mobile radio system which exists in the mobile radio region MFB is, however, compatible with the GSM mobile radio system in the mobile radio region MFA, that is to say the structure of the subscriber data and the subscriber services offered to the mobile subscribers are virtually or entirely identical.

The mobile radio region MFB is supplied over the entire area by local regions MA1', MA2'. . . in which radio cells C1'. . . Cn', C2'. . . Cm' are in each case located. The radio cells C1'. . . Cn' and C2'. . . Cm' have radio devices BTS1'. . . BTSn' and BTS2'. . . BTSm' to which directional antennas RA1'... RAn' and RA2'... RAm' are connected. A mobile switching system MSC1' and a visitor register VLR1' are connected to the radio devices BTS1'... BTSn' in the local region MA1', while a mobile switching system MSC2' and a visitor register VLR2' are wired to the radio devices BTS2'... BTSm' in the local region MA2'. The use of the designations taken from the mobile radio system in accordance with the GSM standard in the mobile radio region MFA for the devices in the local regions MA1'... of the mobile radio region MFB are intended only to express the fact that mutually corresponding radio devices, switching devices and storage devices are arranged in the mobile radio region MFB and in the mobile radio region MFA. However, they do not need to be identical.

At least one home register HLRB which is connected to each visitor register VLR1', VLR2'... in the local regions MA1', MA2'..., is arranged in the mobile radio region MFB, in the same way as in the mobile radio region MFA. A signaling protocol which differs from the signaling protocol in the mobile radio region MFA is used for setting up and clearing connections between the home register HLRB and one of the visitor registers VLR1'... This means that a dedicated home register is provided per mobile radio region even when there are more than two mobile radio regions each having their own signaling protocols.

If the mobile subscriber with his mobile station MS not only leaves his current radio cell C1 within the mobile radio region MFA but also enters the new mobile radio region MFB ("roamed"), the subscriber data which are stored in the home register HLRA of the originating mobile radio region MFA are transmitted to the home register HLRB of the destination mobile radio region MFB, and stored in it. In this way, it is possible in a simple manner to avoid complex conversion of the signaling protocol applicable in the originating mobile radio region MFA to the signaling protocol used in the destination mobile radio region MFB. A link VAB runs between the home register HLRA of the originating mobile radio region MFA and the home register HLRB of the destination mobile radio region, is formed for example by an X.25 packet-switched data link, and on which real-time operation is not required. In contrast, the real-time conditions in the case of a visitor register change in the situation when a mobile subscriber, including his mobile station MS, moves from the radio cell C1 to the radio cell C2 are maintained within one and the same mobile radio region MFA. The same applies in the mobile radio region MFB.

After the subscriber data has been transmitted to the home register HLRB of the destination mobile radio region MFB, the subscriber data which are stored in the visitor register VLR1 of the originating mobile radio region MFA are deleted. Furthermore, the new subscriber number via which the mobile subscriber can be accessed in the destination mobile radio region MFB is designated as being active in the home register HLRA of the originating mobile radio region MFA, while the original subscriber number, via which access was possible to the mobile subscriber in the originating mobile radio region MFA, is set to be inactive. The mobile station MS and the associated subscriber data are thus recorded in the new mobile radio region MFB, in its home register HLRB. If, for example, the mobile station MS makes radio contact with the radio device BTS1' in the radio cell C1' of the destination mobile radio region MFB via the directional antenna RA1', the visitor register VLR1' uses the identification of the mobile station MS to determine the address of the current home register HLRB and requests from there the subscriber data for setting up connections in the mobile switching system MSC1'. The address of the visitor register VLR1' is stored in the new home register HLRB.

If the mobile subscriber, with his mobile station MS, wishes to change to a further mobile radio region (not illustrated), the subscriber data must be transmitted from the home register HLRB of the mobile radio region MFB to the home register there. After completion of the transmission, the subscriber data in the home register HLRB and in the last current visitor register VLR1' are deleted. The previously applicable subscriber number of the mobile subscriber becomes inactive in the home registers HLRA and HLRB, and the new subscriber number, via which the mobile subscriber can be accessed in the new mobile region, is designated as being active in the home register there and in the home register HLRA. If the mobile subscriber changes back to the originating mobile radio region MFA, the procedure is analogous, the subscriber number which is designated as being inactive in the home register HLRA of the originating mobile radio region MFA being activated again. At the same time, the subscriber number of the mobile subscriber is deactivated in the last current mobile radio region.

The subscriber number of the home mobile radio region and of all possible other mobile radio regions is thus permanently stored in the home register of the originating mobile radio region, and the subscriber number of the home mobile radio region and of the originating mobile radio region is stored in the home registers of the other mobile radio regions. If the subscriber is located in the originating mobile radio region, then the associated subscriber number is active in all the registers. If the subscriber logs on in another mobile radio region, then the originating subscriber number becomes inactive only in the home register there and in the home register of the originating mobile radio region, and the subscriber number of the current region becomes active.

The mobile station MS and the associated subscriber data are not recorded in the respective visitor register until, and as soon as, contact has been made with the visitor register or, previously, with the radio devices of the radio cell in which the mobile subscriber is located, and the subscriber data are stored in the home register of the respective mobile radio region.

The change in the home register when the mobile subscriber, including his mobile station MS, moves from the originating mobile radio region MFA to the destination mobile radio region MFB is initiated by the subscriber himself in that control information is transmitted via the mobile station MS and the current visitor register VLR1' to the current home register HLRB, and from there via the link VAB to the home register HLRA of the originating mobile radio region MFA. In principle, the change can also be initiated by the originating mobile radio region MFA or by any other current mobile radio region. As soon as the request for the home register change arrives in the original home register HLRA, the data transmission to the new home register HLRB of the destination mobile radio region MFB takes place immediately thereafter or at a desired, subsequent point in time. The home register change can in the simplest case also be requested by the mobile subscriber via a telephone or data link to the operator of the mobile radio system in the mobile radio region MFA.

The combination of the known visitor register change with the new home register change results in a highly flexible mobile radio system for mobile radio regions having signaling protocols which are not mutually compatible. The mobile radio regions MFA and MFB may be countries or even continents at great distances from one another—as indicated in the present examples—between which the home register change can be completed without complying with real-time criteria. The conventional method for visitor register interchange in real time is retained within each mobile radio region MFA, MFB. The advantage of the invention is the inclusion of mobile radio regions using different signaling protocols in one and the same mobile radio system. However, the combination of different systems—for example analog and digital mobile radio systems—can also be implemented, subject to the precondition that the structure of the subscriber data and the subscriber services offered in the various systems are virtually or completely identical.

The mobile subscribers who move between originating mobile radio region MFA and the destination mobile radio region MFB can be recorded either in the home register of the operator of the mobile radio system in the respective mobile radio region or in a home register set up by another contract partner. An authentication center, which is not illustrated, is connected to each home register and contains current authentication data in the form of an international mobile subscriber identification, a temporary subscriber identity, and individual subscriber code etc. In the mobile radio system, it is possible to make the home register change available either only to selected mobile subscribers, who are defined by an individual subscription, or to all mobile subscribers in general.

The mobile subscribers in the destination mobile radio region can be accessed either via their own subscriber number in the originating mobile radio region and, in addition, via the different subscriber numbers in the various other mobile radio regions. These subscriber numbers are in this case stored in the home register of the originating mobile radio region, as part of the subscriber data. Only the subscriber number of the originating mobile radio region and of the home mobile radio region is stored in the other home registers. Normally, the subscriber number of the originating mobile radio region is sufficient for use as the subscriber number which can be dialed. In principle, the call is then first set up to the originating mobile radio region and, after interrogation of the home register there, is passed on either directly to the subscriber in the originating mobile radio region or to the destination mobile radio region.

If the calling mobile subscriber knows the number of the current mobile radio region of the called mobile subscriber and both mobile subscribers are located in the same mobile radio region, then he can use the subscriber number to access the subscriber on a direct path, without any diversion via the originating mobile radio region. The originating home register can also supply the home registers of other mobile radio regions with the subscriber number of the current mobile radio region, in that the subscriber number which is at the same time used to address the respective home register is transmitted via data links between the respective home registers. If the calling subscriber dials that subscriber number of the mobile radio subscriber which is valid in the closest mobile radio region—for example in his own country—then the call is always set up directly to the current mobile radio region, after interrogation of the home register there. In this case, the calling subscriber does not need to know the current mobile radio region of the called subscriber.

As already mentioned, the link VAB between the home register HLRA of the originating mobile radio region MFA and the home register HLRB of the destination mobile radio region MFB can be implemented by means of a single X.25 packet data link. However, any other data or signaling link can be used in the same way. A number of control commands, which are already in use between the visitor register and the home register for the conventional method of visitor register interchange, can be used on the link VAB. Examples of such control commands are "enter data" (insert subscriber data), "remove data" (delete subscriber data) and "delete the entire subscriber data set" (cancel location). Once a dedicated home register has been installed in the destination mobile radio region, this register can also be used as the basis for "roaming" functions with other operators of mobile radio systems in the respective destination mobile radio region.

In the situation in which, apart from the data and control information which are required for setting up connections to be implemented when a call is made, no additional information—for example relating to the use of additional services by the mobile subscribers—need be interchanged between the mobile radio regions MFA, MFB, the link VAB is used to activate and deactivate the respective subscriber number. The same applies when the service profiles in the various mobile radio regions MFA, MFB are completely independent and thus different.

FIG. 2 shows an illustration of the principle of the data operations to be carried out when the mobile subscriber, including his mobile station MS, changes from the mobile radio region MFA to the mobile radio region MFB. The change in the mobile radio region causes a change in the home register from the home register HLRA to the home register HLRB. The location of the mobile subscriber changes from the local region with the radio device BTS1, the mobile switching system MSC1 and the responsible visitor register VLR1 in the mobile radio region MFA to the new local region with the radio device BTS1', the mobile switching system MSC1' and the currently responsible visitor register VLR1' in the mobile radio region MFB. The change from the home register HLRA to the home register HLRB is initiated by the mobile subscriber himself by his mobile station MS in that control information is transmitted and passed on (1) to the home register HLRA in the mobile radio region MFA by those devices which are responsible on the basis of the location of the mobile subscriber in the mobile radio region MFA—radio device BTS1, mobile switching system MSC1 and current visitor register VLR1.

The subscriber data which are stored in the home register HLRA are transmitted (2) to the new home register HLRB. Once the subscriber data have been transmitted, the subscriber data recorded in the last responsible visitor register VLR1 of the mobile radio region MFA are deleted (3) in the last responsible visitor register VLR1. The mobile station MS is logged in (4) in the new mobile radio region MFB in the new visitor register VLR1', which is now responsible for the mobile subscriber, via the radio device BTS1' and the mobile switching system MSC1' which is connected to the visitor register VLR1'.

The mobile subscriber identifies himself by a temporary subscriber identity assigned to him (temporary mobile subscriber identity, TSMI) and by a region identity which defines the local region and thus the responsibility area of the visitor register (local area identity, LAI). The mobile subscriber is recorded in the authentication center which is connected to the respective home register, using a subscriber identification number assigned to him. As soon as the mobile subscriber is known in the authentication center, the subscriber data can be entered in the home register. Irrespective of where the mobile subscriber is located, his security parameters are required at his respective location. The current visitor register thus ensures that these security parameters are obtained from the authentication center via the home register. In order that the international mobile subscriber identification (international mobile subscriber identity, IMSI) need not be transmitted again whenever the subscriber accesses the mobile radio system, the mobile subscriber receives the temporary subscriber identity when he first logs in to the mobile radio system, by means of the current visitor register. The current visitor register VLR1' carries out the authentication (5) on the basis of this temporary subscriber identity.

The visitor register VLR1' requests the subscriber data from the home register HLRB using the international mobile subscriber identification (6). The home register HLRB then transmits the subscriber data to the currently responsible visitor register VR1' (7). The visitor register VLR1' assigns a new temporary subscriber identity (TMSI) to the mobile subscriber (8).

FIG. 3 shows an illustration of the principle of data operations when changes occur to the subscriber data, for the case of a home register change as a result of the mobile subscriber, including his mobile station MS, moving from the mobile radio region MFA to the mobile radio region MFB. A change to the subscriber data is requested by the mobile subscriber by his mobile station MS, from the current home, register HLRB in the mobile radio region MFB. To this end, control information is transmitted (1) via the respective devices in the responsible local region—that is to say via the radio device BTS1', the mobile switching system MSC1' and the responsible visitor register VLR1'—to the home register HLRB.

This request is passed on (2) from the home register HLRB to the home register HLRA in the original mobile radio region MFA. There, the changed subscriber data are initially checked by the home register HLRA and are entered therein. After this, the changed subscriber data can be transmitted back to the home register HLRB in the new mobile radio region MFB immediately or at a desired, subsequent point in time, and can be stored (3). A control signal which designates the acceptance or rejection of the request, is transmitted back, in the transmission direction towards the mobile station MS, from the home register HLRB via the visitor register VLR1', the mobile switching system MSC1' and the radio device BTS1' as acknowledgement of the request (4). This is necessary in order to ensure the consistency of the data in the mobile radio system having a plurality of mobile radio regions and dedicated home registers arranged in them.

FIG. 4 shows an illustration of the principle of data operations during the production of a connection for the incoming calls to the mobile subscriber for the situation of a home register change when the mobile subscriber moves from the mobile radio region MFA to the mobile radio region MFB. In addition to the devices, which are illustrated in FIG. 1, in the mobile radio region MFB—radio device BTS1', mobile switching system MSC1', visitor register VR1'—and in the mobile radio region MFA—radio device BTS1, mobile switching system MSC1 and visitor register VLR1—a separate mobile switching system GMSC (gateway mobile switching center) is arranged in the mobile radio region MFA in order to receive a call arriving from another network—for example the public telephone network or another mobile radio network.

On the basis of the subscriber number dialed by the calling subscriber, the call is initially received in the original mobile radio region MFA and is received (1) there by the separate mobile switching system GMSC. The home register HLRA of the mobile radio region MFA is interrogated (2) for the location of the mobile subscriber using the subscriber number. The home register HLRA transmits a request to the visitor register VLR1 in whose responsibility area the called mobile subscriber is currently located (3). The visitor register VLR1 determines the current location of the mobile subscriber using the mobile subscriber identity (international mobile subscriber identity, IMSI) transmitted by the home register HLRA, and transmits a "roaming" number (mobile station roaming number, MSRN), which is assigned to the mobile station of the called mobile subscriber, to the home register HLRA and, from there, to the additional mobile switching system GMSC (4). The separate mobile switching system GMSC passes the call through to the mobile switching system MSC1 which is responsible for the mobile subscriber located in its responsibility area (5). The mobile switching system MSC1 requests the subscriber data from the responsible visitor register VLR1 (6), on the basis of which the connection can be set up to the called mobile subscriber (7).

If it is determined that the mobile subscriber is not recorded in the original home register HLRA, the home register HLRA transfers the subscriber number of the mobile radio region MFB to the mobile switching system GMSC, which passes on the subscriber number to the additional mobile switching system GMSC' in the new mobile radio region MFB (4a). The new home register HLRB is interrogated by the additional mobile switching system GMSC' for the location of the mobile subscriber (5a). The home register HLRB then directs a request to the new visitor register VLR1' in whose responsibility area the mobile subscriber is located (6a), in order to obtain from there the "roaming" number (MSRN) assigned to the mobile station of the called mobile subscriber. This number is passed on to the additional mobile switching system GMSC' in order to pass the call on to the responsible mobile switching system MSC1' (8a). The mobile switching system MSC1' requests the subscriber data (9a) from the visitor register VRL1', using which a connection is set up (10a) directly to the mobile subscriber in the mobile radio region MFB, via the radio device BTS1'.

The setting up and clearing of connections between the home register and the respective visitor register, and the interchange of data and control information across mobile radio region boundaries is carried out without adaptation of the signaling protocols respectively used therein, since the mobile station of the mobile subscriber can in each case access the current home register of the mobile radio region. The mobile station and the associated subscriber data of the mobile subscriber are active at any point in time in only a single home register, specifically in the respectively responsible home register of the mobile radio region in which the mobile subscriber is currently located.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A mobile radio system having at least two mobile radio regions, comprising:

control information and data being transmitted and received by mobile stations of mobile subscribers;

during transmission or reception, the mobile stations being wirelessly connected via air interface to radio devices of a base station system;

at least one home register in a respective mobile radio region of the at least two mobile radio regions for storage of subscriber data which is characteristic for each mobile subscriber located therein; and at least one visitor register connected to a respective home register of the at least one home register for storage of subscriber data of the mobile subscribers who enter a responsibility area of the respective home register;

wherein before transfer of a mobile station of a mobile subscriber from an originating mobile radio region of the at least two mobile radio regions to a destination mobile radio region of the at least two mobile radio regions, the subscriber data which is stored in a home register of the originating mobile radio region is transmitted to a home register of the destination mobile radio region and is stored therein; and wherein as soon as a radio link is produced by the mobile station of the mobile subscriber to a radio device of the destination mobile radio region, a current visitor register receives from the home register of the destination mobile radio region the subscriber data of the mobile subscriber who is entering a responsibility area of the destination mobile radio region.

2. The mobile radio system as claimed in claim 1, wherein a line-switched or packet-switched link or a signaling link is provided between the home register of the originating mobile radio region and the home register of the destination mobile radio region.

3. The mobile radio system as claimed in claim 2, wherein a subscriber number which is dialed to set up a call can be activatable and deactivatable via the link running between the old home register and the new home register.

4. The mobile radio system as claimed in claim 1, wherein, before transfer of the mobile station of the mobile subscriber from the originating mobile radio region to the destination mobile radio region, a change from an old home register to a new home register is requested by the mobile subscriber via a telephone link or a data link.

5. The mobile radio system as claimed in claim 4, wherein the change from the old home register to the new home register is requested by the mobile subscriber in the originating mobile radio region via a mobile station of the mobile subscriber, the responsible visitor register and the old home register or, in the destination mobile radio region, via a mobile station of the mobile subscriber, the responsible visitor register, the new home register, the link running between the old and new home registers and the old home register.

6. The mobile radio system as claimed in claim 1, wherein an address of the new home register in the destination mobile radio region is provided by the current visitor register of the destination mobile radio region by identification of the mobile station which is being transferred to the destination mobile radio region.

7. The mobile radio system as claimed in claim 1, wherein changed subscriber data is first entered in the home register of the originating mobile radio region and then transmitted to the home register of the destination mobile radio region.

8. The mobile radio system as claimed in claim 7, wherein a request to change the subscriber data in the home register of the destination mobile radio region is passed to the home register of the originating mobile radio region and the change is checked there, and wherein a control signal which characterizes the rejection or the acceptance of the request is transmitted back to the mobile station.

9. The mobile radio system as claimed in claim 1, wherein subscriber numbers of the mobile subscriber for the originating mobile radio region and for other mobile radio regions are stored in the home register of the originating mobile radio region, and the subscriber number for the originating mobile radio region and the subscriber number for the home mobile radio region are each stored in home registers of the other mobile radio regions as part of the subscriber data for setting up a call.

10. The mobile radio system as claimed in claim 9, wherein, during a change from the originating mobile radio region to the destination mobile radio region, an original subscriber number, via which it was possible to access the mobile subscriber in the originating mobile radio region, is set to be inactive in the home register of the destination mobile radio region, and a new subscriber number, via which it is currently possible to access the mobile subscriber in the destination mobile radio region, is set to be active in the home register of the destination mobile radio region.

11. The mobile radio system as claimed in claim 9, wherein a call using the subscriber number for the originating mobile radio region dialed by a calling subscriber is first set up to the originating mobile radio region and, after interrogation of the home register of the originating mobile radio region, is passed on directly to a called mobile subscriber in the originating mobile radio region or in the destination mobile radio region.

12. The mobile radio system as claimed in claim 11, wherein, if the called subscriber is present in the originating mobile radio region, the address of a current visitor register is provided by the home register thereof in the originating mobile radio region, while, if the called subscriber is present in the destination mobile radio region, the new subscriber number is provided by the home register of the originating mobile radio region and a link is produced to a separate mobile switching system of the destination mobile radio region, which system requests from the current home register an address of the current visitor register in the destination mobile radio region, and wherein the call to the current visitor register is set up using the address provided.

13. The mobile radio system as claimed in claim 9, wherein the subscriber number of the current mobile radio region is transmitted from the home register of the originating mobile radio region to home registers of the other mobile radio regions and stored therein, and wherein a call is set up directly to the called mobile subscriber in the current mobile radio region, using a subscriber number dialed by a calling subscriber for the closest mobile radio region, after interrogation of the home register in the current mobile radio region.

14. The mobile radio system as claimed in claim 9, wherein, if a calling mobile subscriber is present in the destination mobile radio region, the call is passed on directly in the destination mobile radio region to a called mobile subscriber, using the subscriber number of the destination mobile radio region dialed by the calling mobile subscriber.

15. The mobile radio system as claimed in claim 1, wherein the mobile radio system further comprises various mobile radio systems, which are compatible with one another in terms of subscriber data and subscriber services which are available to the mobile subscribers, are used with incompatible signaling protocols for transmission of data and control information in the mobile radio regions.

* * * * *